United States Patent Office 2,875,074
Patented Feb. 24, 1959

2,875,074

NACREOUS MOLYBDENUM AND TUNGSTEN OXIDES

Lawrence Suchow, New York, N. Y., assignor to Francis Earle Laboratories, Inc., Peekskill, N. Y., a corporation of New York No Drawing. Application August 24, 1956
Serial No. 605,940

15 Claims. (Cl. 106—47)

This invention relates to nacreous pigments of molybdenum and tungsten trioxide.

Substances which have a high index of refraction and are in the form of thin, plate-like crystals are commonly used to produce a nacreous, mother-of-pearl effect. The optical effect can be achieved either by coating the surface of an object with a vehicle containing such crystals or by incorporating the crystals within light-transmitting substances, such as plastics, in which case the optical effect becomes an integral part of the object.

To produce pearly luster in surface coating, nacreous pigments are suspended in a light-transmitting, film-forming vehicle which is applied to a surface so that the thin, plate-like crystals of the pigment lie parallel to one another and generally perpendicular to incident light. The nacre is caused by simultaneous reflection of light from the many parallel surfaces at different depths, which produces a velvety pearl-like luster rather than the metallic mirror-like luster characteristic of light reflected from a single surface.

Integral mother-of-pearl effects can be produced with many transparent or translucent substances by incorporation of the nacreous material within the substance itself. For example, simulated mother-of-pearl knife handles and fountain pen barrels can be made by incorporating a nacreous pigment in a plastic, such as cellulose acetate, which is then molded into the appropriate shape. Simulated pearl buttons are made from discs which are cut from acrylic or polyester sheets containing oriented pearly pigment; the nacreous pigment is suspended in the appropriate polymerizable resin, which is then cast to form a solid sheet in which the nacreous effect is incorporated. It is important in this application that the plate-like crystals have the proper orientation at the time of gelation.

To obtain pearly luster, the index of refraction of the crystal should differ from that of the medium by as wide a margin as possible. Generally, a suitable nacreous effect begins to appear when the index of refraction of the medium and that of the crystal differ by approximately 0.2 and improves as the difference increases.

Pearl essence, a composition in which the nacreous material consists of the guanine crystals derived from fish scales, is a very effective nacreous pigment, but at the same time is a relatively expensive product. Lead hydrogen phosphate, lead hydrogen arsenate, and several other inorganic compounds may also be prepared in nacreous form, but these compounds generally have relatively low thermal decomposition temperatures and in addition are limited in their application to uses in which the presence of lead compounds is unobjectionable. For example, the synthetic nacreous compositions have heretofore not been available for certain cosmetic uses wherein the presence of lead compounds should be avoided.

It is an object of this invention to provide a novel nacreous composition which will be economical to produce and will at the same time be more effective in a given concentration than existing nacreous pigments.

It is another object of this invention to provide a method for preparing this novel nacreous composition.

Another objection of this invention is to provide articles of manufacture in which are incorporated a novel synthetic nacreous pigment.

It has been found that excellent nacreous pigments of molybdenum trioxide and of tungsten trioxide may be prepared by crystallization of either of these two compounds, or mixtures thereof, from melts containing one or both of these compounds. The melts are made by combining molybdenum trioxide or tungsten trioxide with a boron compound such as boric acid ($H_3BO_3$), boric oxide ($B_2O_3$) or a metallic borate such as an alkali metal borate. Both the tungsten and molybdenum trioxides have high refractive indices and are, therefore, particularly suitable for the production of pearly luster.

Another advantage inherent in the utilization of these oxides as nacreous pigments lies in their relatively high thermal stability, molybdenum trioxide ($MoO_3$) having a melting point of 795° C. and tungsten trioxide ($WO_3$) a melting point of 1473° C.

The nacreous pigments are prepared by heating, above the respective melting points, mixtures of 10 to 90 weight percent molybdenum trioxide, tungsten trioxide, or a mixture thereof, with boric acid, boric oxide or a metallic borate such as an alkali metal borate. The melt is then cooled rapidly in order to produce crystals of optimum size for nacreous pigments, leached with hot water, filtered and washed.

Crystal plates giving best results are in the size range of from 2 to 100 microns. This dimension is the diameter as measured in the plane of the flat, plate-like crystal. The thickness of such crystals would be of the order of about 0.1 to 1 micron.

It is further desired that the ratio of diameter to thickness be at least 4. Thus, particles of 2 microns in diameter are suitable if they are 0.5 micron or less in thickness. Platelets 1 micron thick should be at least 4 microns in diameter. Although particle size of 2 to 100 microns diameter produce optimum luster, platelets which are as small as 0.5 micron in diameter are suitable if the crystals are sufficiently thin.

The actual size of the crystals varies with the rate at which the melt is cooled, and if desired, with slow cooling it is possible to grow large, macroscopic crystals which may find application in other fields, e. g. in electronic applications.

Although the present invention is not to be construed as relying upon the particular theory as to how the crystals are formed, it would appear that, in the case of tungsten trioxide, the molten boron compound acts as a flux or solvent from which the nacreous pigment composition may be crystallized. In the case of molybdenum trioxide, the boron compound may act either as a flux or as a physical restrainer of crystal growth, or possibly have both effects. In this connection it has been found that quite large crystals may be formed by heating and cooling molybdenum trioxide without the use of the boron compound. When the molybdenum trioxide pigment is recrystallized in the absence of the boron compound, the crystals take on a bluish appearance, apparently due to loss of oxygen. The boron compound inhibits this effect and will produce a product which is more nearly white or slightly yellowish white. The tungsten trioxide pigment is also slightly yellowish white.

The following examples will illustrate specifically the method for preparation of the pigments.

*Example I*

65 parts by weight of $WO_3$ are mixed with 35 parts of $K_2B_4O_7 \cdot 4H_2O$, and the mixture is placed in a platinum crucible. The vessel is then placed in a muffle furnace and heated at 1100° C. for 17 hours, after which cooling is accomplished rapidly by air quenching. The solidified melt is leached with hot water, the suspension filtered, and the pigment which is retained by the filtering medium is then washed with water.

*Example II*

2 parts by weight of $MoO_3$ are mixed with 8 parts of $B_2O_3$, and the mixture placed in an appropriate crucible or other container such as one made of platinum. The mixture is heated at 880° C. for 17 hours and then cooled by air quenching. The melt is leached with hot water and the crystals are filtered off and washed with water.

The crystals produced by the procedure outlined in either of the above examples, when suspended in water or in an organic solvent, produce on stirring, the silky or pearly appearance which is typical of nacreous crystals. The motion of the liquid causes the crystals to be oriented with respect to each other, and luster is produced as light is reflected from numerous parallel faces.

The form in which the nacreous crystals are commonly prepared is that of a paste which contains as the vehicle thereof, a light-transmitting, preferably clear liquid which is compatible with lacquers, resins, and plastics. For certain applications it is desirable to use the nacreous pigment in the form of a dry powder, although drying often causes a partial loss in luster through agglomeration of individual crystal platelets. Other applications utilize the nacreous crystals in aqueous suspension.

For surface coating, the $MoO_3$ and $WO_3$ nacreous pigments of the present invention can be suspended in a cellulose nitrate lacquer. However, there may be substituted almost any clear lacquer formula as the vehicle for the metal oxide pigment. Generally a translucent or transparent plastic material such as cellulose acetate, alkyd resins, the vinyl resins, as well as the acrylic acid ester resins are found to be quite useful. A typical paste composition useful for stock material to be diluted to a useful concentration level is the following:

| | Percent |
|---|---|
| Nacreous $MoO_3$ or $WO_3$ | 25.0 |
| Cellulose nitrate lacquer | 75.0 |

The lacquer may have a formulation like the following:

| | Percent |
|---|---|
| Cellulose nitrate (15–20 seconds) | 8 |
| Ethanol | 3–20 |
| Amyl acetate | 89–72 |

The water-washed crystals which have been described above can be made compatible with a lacquer of this type by being washed with a suitable water-miscible organic solvent, such as ethanol.

When used to make simulated pearls by the coating of alabaster glass or plastic beads, the lacquer paste containing 25 percent nacreous pigment is further diluted with a clear cellulose nitrate lacquer of the appropriate viscosity. Such lacquers, suitable for coating objects by dipping, spraying, etc., for best results should contain from 0.25 percent to 2.5 percent $MoO_3$ or $WO_3$ crystals.

The solvent, instead of containing primarily amyl acetate as indicated in the above example, may comprise butyl acetate, acetone, or other commonly used organic solvents.

For incorporation in a plastic, such as methyl methacrylate, it is convenient to disperse the nacreous crystals in a plasticizer rather than in a lacquer formulation. A suitable composition for this purpose is:

| | Percent |
|---|---|
| Nacreous $MoO_3$ or $WO_3$ | 25.0 |
| Acetone | 20.0 |
| Dibutyl phthalate | 55.0 |

The pigment paste is blended with a plastic molding powder, such as methyl methacrylate, in such quantity as to yield a final concentration in the plastic of approximately 0.5 percent nacreous pigment. The plastic can be extruded into rods, injection molded into various shapes, etc.

For use in casein plastics, where the presence of organic solvents is not necessary, it is most convenient to prepare the nacreous pigment in the form of a paste in water. The desired quantity of this aqueous paste is then incorporated in the casein powder prior to processing. Generally the desired effects are obtained when the concentration of $MoO_3$ or $WO_3$ crystals is ¼ percent to 2 percent of the weight of the casein. The high effectiveness of these oxides is demonstrated by the fact that at least four times as much conventional nacreous pigment, such as lead hydrogen phosphate, is required to produce the same coverage or hiding power.

The very high melting points of $MoO_3$ and $WO_3$ also make possible their use as nacreous pigments in transparent inorganic substances, such as glasses. The dry crystals may be dispersed in molten glass, and then oriented by the operations utilized in molding or blowing the glass. The time during which the mixtures remain at the elevated temperature must be limited, however, since some molten glasses have some solubilizing effect on the oxides. Any deleterious effect is avoided by fairly rapid cooling.

In the foregoing the invention has been described only in connection with preferred embodiments thereof. Many variations and modifications of the principles of my invention within the scope of the description herein are obvious. Accordingly, it is preferred to be bound not by the specific disclosure herein, but only by the appending claims.

I claim:

1. A nacreous composition comprising a paste having as a nacre-producing substance therein flat, plate-like crystals of at least one member from the group consisting of molybdenum trioxide and tungsten trioxide, said crystals being suspended in an organic light-transmitting liquid vehicle and having a thickness not greater than 1 micron and a ratio of diameter to thickness of at least 4.

2. The composition of claim 1 in which the particle size of the nacre-producing crystals is in the range of from 2 to 100 microns.

3. A nacreous coating composition comprising 0.25 percent to 2.5 percent flat, plate-like crystals of at least one member from the group consisting of molybdenum trioxide and tungsten trioxide suspended in a light-transmitting lacquer, the said crystals having a thickness not greater than 1 micron and a ratio of diameter to thickness of at least 4.

4. The composition of claim 3 in which the nacreous pigment is suspended in a cellulose nitrate lacquer.

5. A light-transmitting nacreous article of manufacture having as a nacre-producing pigment therein, plate-like crystals of a member from the group consisting of molybdenum trioxide, tungsten trioxide, or mixtures thereof, the said crystals having a thickness not greater than 1 micron and a ratio of diameter to thickness of at least 4.

6. The article set forth in claim 5 in which said article is made of a light-transmitting substance from the group consisting of glass, polymethyl methacrylate and casein plastics.

7. A nacreous pigment having, as a nacre-producing substance therein, plate-like crystals of at least one member from the group consisting of molybdenum trioxide and tungsten trioxide, said crystals having a thickness not greater than 1 micron and a ratio of diameter to thickness of at least 4.

8. The pigment as set forth in claim 7 in which the crystals are of molybdenum trioxide.

9. The pigment as set forth in claim 7 in which the crystals are of tungsten trioxide.

10. A nacreous pigment having, as a nacre-producing substance therein, plate-like crystals of at least one member from the group consisting of molybdenum trioxide and tungsten trioxide, said crystals having a diameter in the range of about 2 to 100 microns and a thickness in the range of about 0.1 to 1 micron.

11. The method of preparing a nacreous composition which comprises mixing at least one member from the group consisting of molybdenum trioxide and tungsten trioxide with a boron compound from the group consisting of boron oxide and an alkali metal borate, fusing the said mixture, quenching the fused melt leaching the solidified melt and separating therefrom nacre-producing plate-like crystals having a particle size not greater than about 100 microns and a diameter to thickness ratio of at least 4.

12. The method of preparing a nacreous composition which comprises mixing at least one member from the group consisting of molybdenum trioxide and tungsten trioxide with a boron compound from the group consisting of boron oxide and an alkali metal borate, fusing the said mixture, quenching the fused melt, leaching the solidified melt with hot water, filtering the resulting suspension and removing from the filtering medium nacre-producing plate-like crystals having a particle size in the range of about 2 to 100 microns and a diameter to thickness ratio of at least 4.

13. The method of claim 12 in which the crystals after filtering are washed with water.

14. The method for preparing nacreous tungsten trioxide which comprises mixing tungsten trioxide with an alkali metal borate, fusing the said mix, cooling the fused mix by air quenching, leaching the resulting solidified melt with hot water and filtering from the resulting suspension plate-like crystals of tungsten trioxide, having a particle size not greater than about 100 microns and a diameter to thickness ratio of at least 4.

15. The method of preparing nacreous molybdenum trioxide which comprises mixing molybdenum trioxide with boron oxide, fusing the said mix, quenching the fused melt in air and subsequently leaching with hot water and filtering from the leached suspension plate-like molybdenum trioxide crystals, having a particle size not greater than about 100 microns and a diameter to thickness ratio of at least 4.

References Cited in the file of this patent

UNITED STATES PATENTS

| | | |
|---|---|---|
| 1,438,395 | Paisseau | Dec. 12, 1922 |
| 1,602,688 | Lindsay | Oct. 12, 1926 |
| 1,911,104 | Bucy | May 23, 1933 |
| 1,967,936 | Hopkins | July 24, 1934 |
| 2,256,549 | Collins | Sept. 23, 1941 |
| 2,311,533 | Gertzoy | Feb. 16, 1943 |
| 2,363,570 | Caprio | Nov. 28, 1944 |
| 2,372,334 | Murphy | Mar. 27, 1945 |
| 2,555,224 | Decker | May 29, 1951 |
| 2,663,658 | Schurecht | Dec. 22, 1953 |

OTHER REFERENCES

Industrial Finishing, June 1950, pages 50–52.